(12) United States Patent
Gao et al.

(10) Patent No.: US 11,973,795 B2
(45) Date of Patent: Apr. 30, 2024

(54) BGP MESSAGE SENDING METHOD, BGP MESSAGE RECEIVING METHOD, AND DEVICE

(71) Applicant: Huawei Technologies Co., Ltd., Shenzhen (CN)

(72) Inventors: Yuan Gao, Nanjing (CN); Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/138,205

(22) Filed: Dec. 30, 2020

(65) Prior Publication Data

US 2021/0152593 A1    May 20, 2021

Related U.S. Application Data

(63) Continuation of application No. PCT/CN2019/092443, filed on Jun. 23, 2019.

(30) Foreign Application Priority Data

Jun. 30, 2018 (CN) .......................... 201810703112.1

(51) Int. Cl.
*H04L 9/40* (2022.01)
*H04L 45/00* (2022.01)
(Continued)

(52) U.S. Cl.
CPC .......... *H04L 63/1441* (2013.01); *H04L 45/66* (2013.01); *H04L 45/72* (2013.01);
(Continued)

(58) Field of Classification Search
CPC ..... H04L 63/1441; H04L 45/66; H04L 45/72; H04L 45/745; H04L 47/825; H04L 63/0236
See application file for complete search history.

(56) References Cited

U.S. PATENT DOCUMENTS 11,178,174 B2 * 11/2021 Hayward ............ H04L 63/1416
2011/0317703 A1    12/2011 Dunbar et al.
(Continued)

FOREIGN PATENT DOCUMENTS

CN    101621428 A    1/2010
CN    102971992 A    3/2013
(Continued)

OTHER PUBLICATIONS

P. Nesser II, "The Internet and the Millennium Problem (Year 2000)," RFC 2626, Jun. 1999, 275 pages.
(Continued)

*Primary Examiner* — Sarah Su
*Assistant Examiner* — Saad Ahmad Abdullah
(74) *Attorney, Agent, or Firm* — Conley Rose, P.C.

(57) ABSTRACT

A BGP message sending method includes: determining, by a first network device, that a host identified by a first MAC address is an attacker; generating, by the first network device, a BGP message, where the BGP message includes the first MAC address and indication information, and the indication information is used to indicate that the host identified by the first MAC address is the attacker; and sending, by the first network device, the BGP message to a second network device.

21 Claims, 4 Drawing Sheets

(51) Int. Cl.
*H04L 45/745* (2022.01)
*H04L 47/70* (2022.01)

(52) U.S. Cl.
CPC .......... *H04L 45/745* (2013.01); *H04L 47/825* (2013.01); *H04L 63/0236* (2013.01)

(56) References Cited

U.S. PATENT DOCUMENTS

| | | | |
|---|---|---|---|
| 2016/0373447 | A1 | 12/2016 | Akiyama et al. |
| 2017/0048154 | A1* | 2/2017 | Fung ................ H04L 49/25 |
| 2017/0163544 | A1* | 6/2017 | Bhandarkar ........ H04L 41/0806 |
| 2017/0250945 | A1 | 8/2017 | Wadhwa et al. |
| 2018/0084005 | A1* | 3/2018 | Dousti ............. H04L 63/1458 |
| 2018/0159771 | A1* | 6/2018 | Malloy ............. H04L 45/7452 |
| 2019/0296966 | A1* | 9/2019 | Gao ................ H04L 45/22 |
| 2020/0067731 | A1 | 2/2020 | Fu |
| 2020/0186447 | A1 | 6/2020 | Song |

FOREIGN PATENT DOCUMENTS

| | | | | |
|---|---|---|---|---|
| CN | 104283882 | A | 1/2015 | |
| CN | 105763440 | A | 7/2016 | |
| CN | 106161226 | A | 11/2016 | |
| CN | 106878258 | A | 6/2017 | |
| CN | 107154939 | A | 9/2017 | |
| CN | 107743095 | A | 2/2018 | |
| CN | 107770294 | A | 3/2018 | |
| CN | 108023974 | A | 5/2018 | |
| CN | 108199945 | A | 6/2018 | |
| EP | 2194677 | A1 * | 6/2010 | ............ H04L 41/22 |
| EP | 2194677 | A1 | 6/2010 | |
| EP | 2448211 | A1 | 2/2012 | |
| JP | 2005130190 | A | 5/2005 | |
| JP | 2018029303 | A | 2/2018 | |
| JP | 2019510406 | A | 4/2019 | |
| WO | 2018024187 | A1 | 2/2018 | |
| WO | 2018090907 | A1 | 5/2018 | |

OTHER PUBLICATIONS

Xiao, L., et al, "Analysis of Router Attack Methods in Backbone Network," Electronic Technology and Software Engineering, 2015, Issue 11, 2 pages.
Schlamp, J., et al., "HEAP: Reliable Assessment of BGP Hijacking Attacks," IEEE Journal on Selected Areas in Communications, arXiv:1607.00096v1, Jul. 1, 2016, 13 pages.
Sangli, S., et al, "BGP Extended Communities Attribute," Network Working Group, RFC 4360, Feb. 2006, 12 pages.
Bates, T., et al., "Multiprotocol Extensions for BGP-4," Network Working Group, RFC 4760, Jan. 2007, 12 pages.
Mahalingam, M., et al., "Virtual extensible Local Area Network (VXLAN): A Framework for Overlaying Virtualized Layer 2 Networks over Layer 3 Networks," RFC 7348, Aug. 2014, 22 pages.
Sajassi, A., Ed et al, "BGP MPLS-Based Ethernet VPN," Internet Engineering Task Force (IETF), RFC 7432, Feb. 2015, 56 pages.

\* cited by examiner

BGP MESSAGE SENDING METHOD, BGP MESSAGE RECEIVING METHOD, AND DEVICE

CROSS-REFERENCE TO RELATED APPLICATIONS

This is a continuation of Int'l Patent App. No. PCT/CN2019/092443 filed on Jun. 23, 2019, which claims priority to Chinese Patent App. No. 201810703112.1 filed on Jun. 30, 2018, which are incorporated by reference.

FIELD

This disclosure relates to the field of communications technologies, and in particular, to a Border Gateway Protocol (BGP) message sending method, a BGP message receiving method, and a related device.

BACKGROUND

A network device may be connected to a plurality of hosts. For example, the network device may be a switch. When the network device receives a packet from a host, the network device may forward the packet. The plurality of hosts may include an attacker. For example, a host 1 is the attacker. An engineer may manually configure, on the network device, a forwarding rule of the host 1. The forwarding rule includes a medium access control (MAC) address of the host 1. For example, the MAC address has 48 bits. When the network device detects that a source MAC address of the packet received by the network device is the MAC address of the host 1, the network device may discard the packet according to the forwarding rule.

In the foregoing technical solution, the engineer needs to manually configure the forwarding rule of the attacker, and workloads of manual configuration are relatively heavy.

SUMMARY

This disclosure provides a BGP message sending method, a BGP message receiving method, and a related device, to help reduce workloads of manual configuration.

This disclosure provides the following technical solutions.

According to a first aspect, a BGP message sending method is provided. The method includes: A first network device determines that a host identified by a first media access control MAC address is an attacker; the first network device generates a BGP message, where the BGP message includes the first MAC address and indication information, and the indication information is used to indicate that the host identified by the first MAC address is the attacker; and the first network device sends the BGP message to a second network device.

In the foregoing technical solution, after the first network device determines that the host identified by the first MAC address is the attacker, the first network device may generate the BGP message carrying the first MAC address and the indication information, and send the BGP message to the second network device. Further, the second network device may generate, based on the first MAC address and the indication information in the BGP message, a forwarding rule used to prevent the second network device from forwarding a packet received by the second network device to the host identified by the first MAC address. In other words, the second network device may generate the forwarding rule based on the BGP message sent by the first network device, and an engineer does not need to manually configure the forwarding rule on the second network device. Therefore, the foregoing technical solution helps reduce workloads of the engineer in performing manual configuration on the network device.

In a possible design, the first network device includes a first VTEP, and the second network device includes a second VTEP. That the first network device sends the BGP message to a second network device includes: The first VTEP sends the BGP message to the second VTEP.

In the foregoing technical solution, the VTEP may be used to implement transmission of the BGP message.

In a possible design, a first VTEP address identifies the first VTEP, and a second VTEP address identifies the second VTEP. The BGP message includes an Internet Protocol (IP) header and a payload. The IP header includes a destination IP address, and the payload includes MP_REACH_NLRI. The MP_REACH_NLRI includes a next-hop network address. The destination IP address is equal to the second VTEP address, and the next-hop network address is equal to the first VTEP address.

In a possible design, the first VTEP sends the BGP message to the second VTEP through a tunnel. The tunnel is a Virtual eXtensible Local Area Network (VXLAN) tunnel or an LSP.

In a possible design, that the first network device generates a BGP message includes: The first network device determines that a host whose MAC address is the first MAC address is the attacker; the first network device receives a data packet, where a source MAC address of the data packet is the first MAC address; and the first network device generates the BGP message based on a host identified by the source MAC address of the data packet being the attacker.

In the foregoing technical solution, the first network device generates the BGP message based on triggering of the data packet. In other words, when the first network device determines that the host identified by the first MAC address is the attacker, the first network device does not need to immediately generate the BGP message and notify the second network device. When the first network device determines that the host identified by the first MAC address is the attacker, it is possible that the host identified by the first MAC address does not access a network administrated by the first network device. For example, the host identified by the first MAC address may have been offline, or the host identified by the first MAC address may have roamed to another network. Therefore, when the first network device determines that the host identified by the first MAC address is the attacker, the first network device and the second network device may not be attacked by the attacker. When the first network device is not attacked by the attacker, the first network device temporarily does not generate or send the BGP message. This helps reduce overheads of the first network device and the second network device. When the first network device receives the data packet whose source MAC address is the first MAC address, it indicates that the first network device starts to be attacked by the attacker. When the first network device starts to be attacked by the attacker, the first network device notifies the second network device of the MAC address of the attacker. This helps obtain a compromise between reduction of overheads and prevention of an attack from the attacker.

In a possible design, that the first network device generates the BGP message based on a host identified by the source MAC address of the data packet being the attacker includes: The first network device determines that the data packet is from a first VXLAN, where a first VXLAN network identifier (VNI) identifies the first VXLAN; the first network device determines, based on the source MAC address carried in the data packet and that the data packet is from a first VXLAN, that the host identified by the first MAC address is located on the first VXLAN; and the first network device generates the BGP message based on that the data packet is from a first VXLAN, where the BGP message includes the first VNI.

In a possible design, that the first network device determines that the data packet is from a first VXLAN includes: The first network device receives the data packet through a first port, where the first port is configured with the first VNI; and the first network device determines, based on that the first port configured to receive the data packet is configured with the first VNI, that the data packet is from the first VXLAN.

In a possible design, that the first network device determines that the data packet is from a first VXLAN includes: The first network device determines that a first virtual local area network (VLAN) identifier (ID) included in the data packet is configured with the first VNI; and the first network device determines, based on that the first VLAN ID included in the data packet is configured with the first VNI, that the data packet is from the first VXLAN.

According to a second aspect, a BGP message receiving method is provided. The method includes: A second network device receives a BGP message from a first network device, where the BGP message includes a first MAC address and indication information, and the indication information is used to indicate that a host identified by the first MAC address is an attacker; the second network device receives a first packet, where a destination MAC address of the first packet is equal to the first MAC address; and the second network device avoids, based on the first MAC address in the BGP message, the indication information in the BGP message, and the destination MAC address of the first packet, forwarding the first packet to the host identified by the first MAC address.

In a possible design, the second network device receives a second packet. A source MAC address of the second packet is equal to the first MAC address. The second network device avoids, based on the first MAC address in the BGP message, the indication information in the BGP message, and the source MAC address of the second packet, forwarding the second packet.

In a possible design, the first network device includes a first VTEP, and the second network device includes a second VTEP. That a second network device receives a BGP message from a first network device includes: The second VTEP receives routing information from the first VTEP.

In a possible design, the second VTEP receives a BGP update message from the second VTEP. The BGP message is carried in the BGP update message, and the BGP update message includes an IP header and a payload. The IP header includes a destination IP address, and the payload includes MP_REACH_NLRI. The MP_REACH_NLRI includes a next-hop network address. The destination IP address is equal to a second VTEP address, and the next-hop network address is equal to a first VTEP address.

In a possible design, the second VTEP receives the BGP update message from the second VTEP through a tunnel. The tunnel is a VXLAN tunnel or an LSP.

According to a third aspect, a first network device is provided. The first network device includes a processor and a transceiver coupled to the processor. The processor is configured to determine that a host identified by a first MAC address is an attacker. The processor is further configured to generate a border gateway protocol BGP message. The BGP message includes the first MAC address and indication information, and the indication information is used to indicate that the host identified by the first MAC address is the attacker. The transceiver is configured to send the BGP message generated by the processor to a second network device.

In a possible design, the first network device includes a first VTEP, and the second network device includes a second VTEP. The transceiver is configured to send the BGP message from the first VTEP to the second VTEP.

According to a fourth aspect, a second network device is provided. The second network device includes a first transceiver, a second transceiver, and a processor coupled to the first transceiver and the second transceiver. The first transceiver is configured to receive a border gateway protocol BGP message from a first network device. The BGP message includes a first media access control MAC address and indication information, and the indication information is used to indicate that a host identified by the first MAC address is an attacker. The second transceiver is configured to receive a first packet. A destination MAC address of the first packet is equal to the first MAC address. The processor is configured to avoid, based on the first MAC address in the BGP message, the indication information in the BGP message, and the destination MAC address of the first packet, forwarding the first packet to the host identified by the first MAC address.

In a possible design, the second receiver is further configured to receive a second packet. A source MAC address of the second packet is equal to the first MAC address. The processor is further configured to avoid, based on the first MAC address in the BGP message, the indication information in the BGP message, and the source MAC address of the second packet, forwarding the second packet.

In a possible design, the first network device includes a first VTEP, and the second network device includes a second VTEP. The first transceiver is configured to send the BGP message from the first VTEP to the second VTEP.

According to a fifth aspect, a system is provided. The system includes the first network device provided in the third aspect and the second network device provided in the fourth aspect.

According to a sixth aspect, a computer-readable storage medium is provided. The computer-readable storage medium stores a computer program. When the computer program is executed by a network device, the network device is enabled to perform the method provided in the first aspect or the method provided in the second aspect. For example, the network device may be the first network device in the first aspect or the second network device in the second aspect.

According to a seventh aspect, a computer program product is provided. The computer program product includes a computer program. The computer program may be stored in a computer-readable storage medium. When the computer program is executed by a network device, the network device is enabled to perform the method provided in the first aspect or the method provided in the second aspect. For example, the network device may be the first network device in the first aspect or the second network device in the second aspect.

In a possible design of the first aspect to the seventh aspect, the BGP message includes a MAC/IP advertisement route and a MAC mobility extended community. The first MAC address is carried in the MAC/IP advertisement route, and the indication information is carried in the MAC mobility extended community.

In the foregoing technical solution, an EVPN routing message that has been defined by the IETF may be used to advertise the MAC address of the attacker. This helps enable the technical solutions to be compatible with an existing network, thereby reducing implementation costs.

Further, the MAC mobility extended community includes flags having 8 bits, and the indication information is carried on a most significant bit (MSB) of the flags.

In the foregoing technical solution, a field in the EVPN routing message that has been defined by the IETF is used to carry the indication information. This helps enable the technical solutions to be compatible with the existing network, thereby reducing the implementation costs.

In a possible design of the first aspect to the seventh aspect, the BGP message is a BGP update message.

DETAILED DESCRIPTION

Figure 1A:
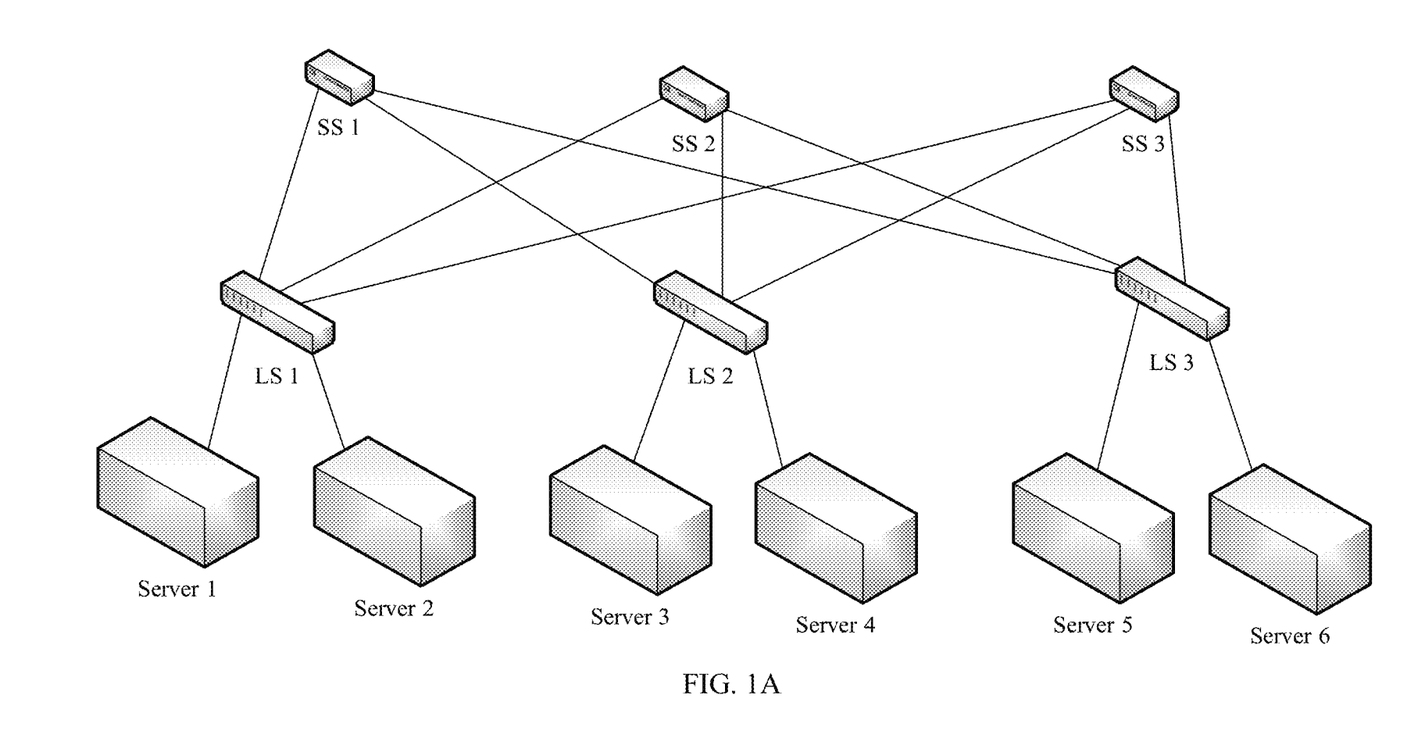
FIG. 1A is a schematic structural diagram of a data center network.

FIG. 1A is a schematic structural diagram of a data center network. With reference to FIG. 1A, the data center network includes a server 1 to a server 6, a leaf switch (LS) 1, an LS 2, an LS 3, a spine switch (SS) 1, an SS 2, and an SS 3. The server 1 and the server 2 are connected to the LS 1; the server 3 and the server 4 are connected to an LS 2; and the server 5 and the server 6 are connected to the LS 3. The LS 1 is connected to the SS 1, the SS 2, and the SS 3; the LS 2 is connected to the SS 1, the SS 2, and the SS 3; and the LS 3 is connected to the SS 1, the SS 2, and the SS 3. The server 1 needs to communicate with another server through the LS 1; and the server 6 needs to communicate with another server through the LS 3. When the server 1 communicates with the server 6, a data stream sent by the server 1 may reach the server 6 through different paths. The different paths include a path 1 (LS 1-SS 1-LS 3), a path 2 (LS 1-SS 2-LS 3), and a path 3 (LS 1-SS 3-LS 3).

Figure 1B:
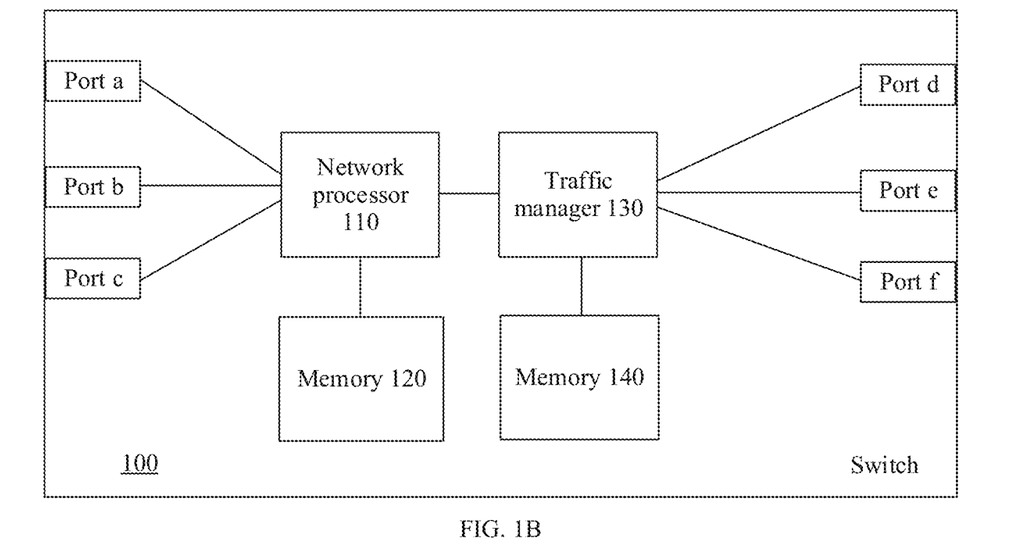
FIG. 1B is a schematic structural diagram of a switch.

FIG. 1B is a schematic structural diagram of a switch. The LS in FIG. 1A may be a switch 100, and the SS in FIG. 1A may be the switch 100. For specific implementations of the LS and the SS in FIG. 1A, refer to descriptions of the switch 100.

With reference to FIG. 1B, the switch 100 includes ports a to f, a network processor 110, a memory 120, a traffic manager 130, and a memory 140. The port a, the port b, and the port c are coupled to the network processor 110; and the port a, the port b, and the port c are sending ports, and may send received packets to the network processor 110. The switch 100 may include more or fewer receive ports. The port d, the port e, and the port f are coupled to the traffic manager 130; and the network processor 110 is coupled to the memory 120. The memory 120 may store a computer program and a forwarding table, and the forwarding table may be a hash table. The network processor 110 may process a packet from the receive port by executing the computer program stored in the memory 120 and/or searching the forwarding table. For example, the network processor 110 may perform a hash algorithm on a hash key in the packet by executing the computer program, to obtain a hash value. For another example, the network processor 110 may determine, by searching the hash table, an entry that matches the hash value. The network processor 110 determines, based on the entry that matches the hash value, the sending port configured to forward the packet. The sending port may be the port d, the port e, or the port f. The network processor 110 is coupled to the traffic manager 130, and the traffic manager 130 is coupled to the memory 140. For example, after determining the sending port configured to forward the packet, the network processor 110 may send the packet to the traffic manager 130. The traffic manager 130 may also be referred to as a scheduler, and the traffic manager 130 may maintain three sending cache queues that are in a one-to-one correspondence with the port d, the port e, and the port f After receiving the packet from the network processor 110, the traffic manager 130 may place, based on the sending port configured to forward the packet, the packet on the sending cache queue corresponding to the sending port configured to forward the packet. The traffic manager 130 may schedule the packet located in the sending cache queue, to send the packet through the sending port. Specifically, the traffic manager 130 may maintain three packet descriptor queues that are in a one-to-one correspondence with the three sending cache queues. The packet descriptor queue includes a plurality of packet descriptors, and each packet descriptor includes an address of the packet stored in the sending cache queue. When the traffic manager 130 needs to place the packet on the sending cache queue, the traffic manager 130 may add a storage address of the packet to the packet descriptor queue. The traffic manager 130 may perform a write operation on the memory 140, to place the packet on the sending cache queue. When needing to dequeue the packet from the sending cache queue, the traffic manager 130 may delete the storage address of the packet from the packet descriptor queue. The traffic manager 130 may perform a read operation on the memory 140, to dequeue the packet from the sending cache queue. After leaving the queue, the packet is sent through the sending port.

It should be noted that the switch shown in FIG. 1B may include a control plane and a forwarding plane. The control plane may be configured to: learn a route, advertise a route, generate a forwarding rule, and update a forwarding table of the forwarding plane. The forwarding plane may be configured to forward a packet based on the forwarding table. The forwarding plane may include the network processor 110, the memory 120, the traffic manager 130, and the memory 140. The control plane may include a central processing unit (CPU) and a memory coupled to the central processing unit. The memory coupled to the central processing unit may store a computer program used to run a network protocol, and the network protocol may be a BGP. The central processing unit may implement a function defined by the BGP by executing the computer program. For example, the central processing unit may learn a MAC address of a server, may generate a routing message based on the MAC address of the server, and may send the routing message to a remote switch. In addition, after receiving a routing message from the remote switch, the switch may update the forwarding table of the forwarding plane based on the routing message from the remote switch. For example, the routing message from the remote switch includes a MAC address of the remote server. The central processing unit may add an entry about the remote server to the forwarding table. Therefore, when the server receives a packet whose destination MAC address is the MAC address of the remote server, the forwarding plane of the switch may forward the packet based on the entry about the remote server.

Figure 1C:
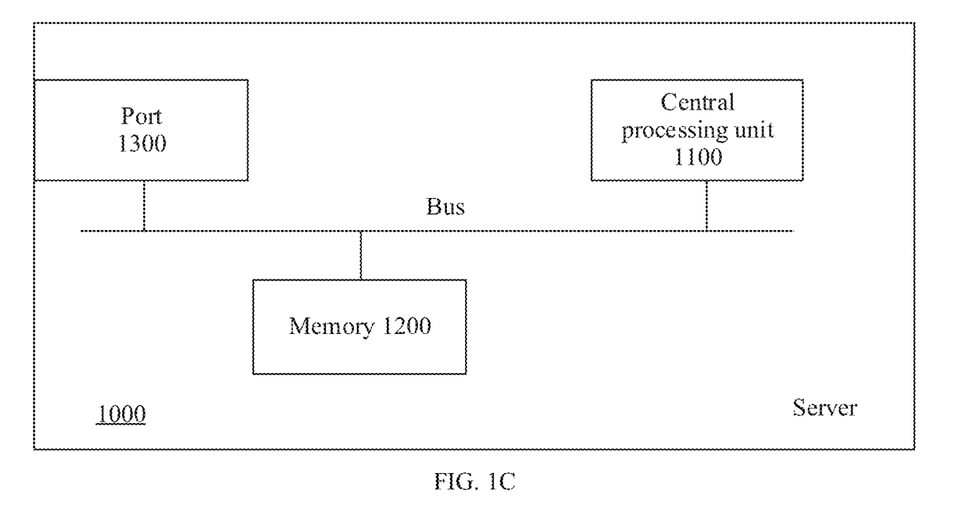
FIG. 1C is a schematic structural diagram of a server.

FIG. 1C is a schematic structural diagram of a server. The server in FIG. 1A may be a server 1000. For a specific implementation of the server in FIG. 1A, refer to descriptions of the server 1000.

With reference to FIG. 1C, the server 1000 includes a central processing unit 1100, a memory 1200, a port 1300, and a bus. The processing unit 1100, the memory 1200, and the port 1300 are coupled through the bus. The memory 1200 stores software, and the software includes an operating system and a plurality of application programs. The central processing unit 1100 runs the operating system and the plurality of application programs by accessing the memory 1200. The operating system may be Windows or Linux. The central processing unit 1100 runs the plurality of application programs based on the operating system. The port 1300 may be configured to receive a packet and send a packet. For example, after the port 1300 receives a packet from a switch 100, the memory 1200 may store the packet. The central processing unit 1100 may process the packet based on the application program. In addition, the central processing unit 1100 may generate a packet based on the application program, and send the packet to the switch 100 through the port 1300.

In addition, the central processing unit 1100 in FIG. 1C may be replaced with another processor. The another processor may be a digital signal processor (DSP), an application-specific integrated circuit (ASIC), a field-programmable gate array (FPGA) or another programmable logic device, a transistor logic device, a hardware component, or any combination thereof. The another processor may implement or execute various example logical blocks, modules, and circuits described with reference to content disclosed in the embodiments. Alternatively, the processor may be a combination of processors implementing a computing function, for example, a combination of one or more microprocessors, a combination of the DSP and a microprocessor, and or the like.

The data center network shown in FIG. 1A may be specifically an Ethernet virtual private network (EVPN). For the EVPN, refer to descriptions of request for comments (RFC) 7432 published by the Internet Engineering Task Force (IETF). RFC 7432 is incorporated by reference in its entirety. Unless otherwise stated, all documents that start with "RFC" and that are mentioned in this disclosure are released by the IETF. For example, RFC 7348 is also released by the IETF.

For example, an LS 1 and an LS 2 may run RFC 7348. Specifically, the LS 1 and the LS 2 each may include a VXLAN tunnel end point (VTEP). A VTEP is an entity configured to originate and/or terminate a VXLAN tunnel. For details about the VTEP, refer to related descriptions in RFC 7348. The VTEP included in the LS 1 is referred to as a VTEP 1, and the VTEP included in the LS 2 is referred to as a VTEP 2. The VTEP 1 is corresponding to a VTEP IP address 1, and the VTEP 2 is corresponding to a VTEP IP address 2. An engineer may manually configure the LS 1, to enable the LS 1 to include the VTEP 1; and the engineer may manually configure the LS 2, to enable the LS 2 to include the VTEP 2. For example, the engineer may configure the VTEP IP address 1 (for example, 1.1.1.9) on the LS 1. In addition, the LS 1 and the LS 2 may be located on a same VXLAN, for example, both the LS 1 and the LS 2 are located on a VXLAN indicated by a VNI. A value of the VNI may be 100. The engineer may configure a VNI (for example, 100) on the LS 1, an RD (for example, 1:1) on the LS 1, and an RT (for example, 1:1) on the LS 1. The engineer configures the VTEP IP address 2 (for example, 2.2.2.9) on the LS 2, and configures a VNI (for example, 100) on the LS 2. In addition, the engineer may configure, on the LS 2, a VXLAN tunnel between the LS 1 and the LS 2. For example, the engineer configures, on the LS 2, information about the VXLAN tunnel. The information may include a source IP address (for example, 2.2.2.9) and a destination IP address (for example, 1.1.1.9). The source IP address is an IP address that is of an ingress node (for example, the VTEP 2) of the VXLAN tunnel and that is in a direction from the LS 2 to the LS 1. The destination IP address is an IP address that is of an egress node (for example, the VTEP 1) of the VXLAN tunnel and that is in a direction from the LS 2 to the LS 1. The engineer configures, on the LS 1, the information about the VXLAN tunnel. The information may include a tunnel type. For example, when a value of the tunnel type is equal to 8, the tunnel type indicates that a tunnel type of the VXLAN tunnel is the VXLAN. In a possible design, the VXLAN tunnel may pass through at least one of an SS 1, an SS 2, and an SS 3. In other words, the at least one of an SS 1, an SS 2, and an SS 3 may be a transit node of the VXLAN tunnel.

The LS 1 runs a BGP, and the LS 2 Runs the BGP. Specifically, the LS 1 includes a processor and a memory, and the memory stores code for implementing a BGP function. The processor (for example, a CPU) in the LS 1 runs the BGP by executing the code, and the LS 2 may also run the BGP through the foregoing mechanism. The LS 2 is a BGP peer of the LS 1, and the LS 1 and the LS 2 may also be referred to as a pair of BGP peers. The LS 1 can learn a MAC address of a server on a network administrated by the LS 1, for example, the LS 1 can learn a MAC address of a server 1 and a MAC address of a server 2. The LS 2 can learn a MAC address of a server on a network administrated by the LS 2, for example, the LS 2 can learn a MAC address of a server 3 and a MAC address of a server 4. The LS 1 may send an EVPN route to the LS 2 through the VXLAN tunnel, and the EVPN route sent by the LS 1 may include the MAC address of the server 1 and the MAC address of the server 2. The LS 2 may send an EVPN route to the LS 1 through the VXLAN tunnel, and the EVPN route sent by the LS 2 may include the MAC address of the server 3 and the MAC address of the server 4.

The following uses an example to describe how the LS 1 learns the MAC address of the server 1 and sends, to the LS 2, the EVPN route carrying the MAC address of the server 1.

The LS 1 includes an interface 1, and the interface 1 is an Ethernet interface. The LS 1 is connected to the server 1 through the interface 1. The engineer configures, on the LS 1, a VNI (for example, 100) associated with the interface 1. The server 1 generates an Ethernet frame 1 and sends the Ethernet frame 1 to the LS 1 through the interface 1, and a source MAC address of the Ethernet frame 1 is the MAC address of the server 1. After receiving the Ethernet frame 1 through the interface 1, the LS 1 determines that an interface receiving the Ethernet frame 1 is the interface 1, and then the LS 1 determines that a value of the VNI administrated by the interface 1 is equal to 100. In addition, the LS 1 parses the Ethernet frame 1 to obtain the MAC address of the server 1. According to RFC 7432, the LS 1 generates a routing message 1 based on configuration information stored by the LS 1 and information obtained by the LS 1 from the Ethernet frame 1. Specifically, the processor (for example, the CPU) in the LS 1 may generate the routing message 1 by executing the code for implementing the BGP function. The following uses an example to describe the routing message 1.

Specifically, the routing message 1 may be carried in an IP packet, and the IP packet includes an IP header and an IP payload. The IP header is adjacent to the IP payload, and the IP payload is behind the IP header. The IP header includes a source IP address, a destination IP address, and a protocol. A value of the source IP address may be equal to the VTEP IP address 1 (for example, 1.1.1.9), and a value of the destination IP address may be equal to the VTEP IP address 2 (for example, 2.2.2.9). The protocol in the IP header is used to indicate a type of a next header of the IP header. For example, when a value of the protocol is equal to 6, the protocol in the IP header indicates that in the IP packet, the next header of the IP header is a Transmission Control Protocol (TCP) header. The IP payload includes a TCP header and a TCP payload. The TCP header is adjacent to the TCP payload, and the TCP payload is behind the TCP header. The TCP header is adjacent to the IP header, the TCP header includes a source port, and the source port in the TCP header may be used to indicate a type of the TCP payload. For example, when a value of the source port is equal to 179, the source port in the TCP header indicates that the TCP payload is a BGP message.

The routing message 1 may be the BGP message, and specifically, the BGP message may be a BGP update message. The routing message 1 may include multiprotocol reachable network layer reachability information (MP_REACH_NLRI), and the MP_REACH_NLRI is a path attribute. For details about the MP_REACH_NLRI, refer to related descriptions in RFC 4760. The routing message 1 may further carry another path attribute. For example, the routing message 1 may further carry a local preference, the MP_REACH_NLRI includes a next-hop network address field, and the next-hop network address field may carry the VTEP IP address 1 (for example, 1.1.1.9) stored on the LS 1.

The routing message 1 includes a MAC/IP advertisement route. For details about the MAC/IP advertisement route, refer to related descriptions in RFC 7432. In addition, the routing message may further include a MAC mobility extended community. For details about the MAC mobility extended community, refer to related descriptions in RFC 7432.

The MAC address of the server 1 may be carried in the MAC/IP advertisement route. Specifically, the MAC/IP advertisement route includes a MAC address field, the MAC address field has 6 bytes, and the MAC address of the server 1 may be carried in the MAC address field. The MAC/IP advertisement route includes a multiprotocol label switching (MPLS) label 1 field. The MPLS label 1 field has three bytes, and the MPLS label 1 field may carry the VNI (for example, 100) stored on the LS 1. The MAC/IP advertisement route includes an RD field. The RD field includes eight bytes, and the RD field may carry the RD (for example, 1:1) stored on the LS 1. In addition, the MAC/IP advertisement route further includes an MPLS label 2 field, and the routing message 1 may include an extended community attribute. For details about the extended community attribute, refer to descriptions of a BGP extended communities attribute in RFC 4360. Specifically, the extended community attribute may include a TunnelType field and an RT field. The TunnelType field may carry the tunnel type (for example, 8) stored on the LS 1, and the RT field may carry the RT (for example, 1:1) stored on the LS 1.

After generating the routing message 1, the LS 1 may send the routing message 1 to the LS 2 through the VXLAN tunnel.

After receiving the routing message 1, the LS 2 parses the routing message 1 to obtain a value of the next-hop network address field in the routing message 1. The value of the next-hop network address field is equal to the VTEP IP address 1 (for example, 1.1.1.9). The LS 2 determines, based on the value of the next-hop network address field obtained from the routing message 1 and the information that is stored on the LS 2 and that is about the VXLAN tunnel, that the LS 2 can send, to the LS 1 through the VXLAN tunnel, an Ethernet frame whose destination address is the MAC address of the server 1. The information includes the source IP address (for example, 2.2.2.9) and the destination IP address (for example, 1.1.1.9). Specifically, the LS 2 determines, based on the value of the next-hop network address field being equal to the destination IP address of the VXLAN tunnel, that the routing message 1 matches the VXLAN tunnel, and then the LS 2 may generate a forwarding entry. The forwarding entry includes a MAC address (for example, the MAC address of the server 1), the VNI (for example, 100), the source IP address (for example, 2.2.2.9), and the destination IP address (for example, 1.1.1.9).

The following uses an example to describe how the LS 2 uses the forwarding entry to forward the Ethernet frame.

When receiving the Ethernet frame (an Ethernet frame 2) whose destination MAC address is the MAC address of the server 1, the LS 2 may determine, based on the destination MAC address in the Ethernet frame 2 being equal to the MAC address in the forwarding entry, that the Ethernet frame 2 matches the forwarding entry. Then, the LS 2 may encapsulate the Ethernet frame 2 to obtain an encapsulated packet. Specifically, the LS 2 may add a tunnel header to the Ethernet frame 2, and the tunnel header may include the source IP address (for example, 2.2.2.9), the destination IP address (for example, 1.1.1.9), and the VNI (for example, 100). The LS 2 may obtain, from the forwarding entry, a value of a field in the tunnel header, to implement encapsulation of the Ethernet frame 2. After generating the encapsulated packet, the LS 2 may send the encapsulated packet to the LS 1 through the VXLAN tunnel. In the foregoing example, a tunnel between the LS 1 and the LS 2 is the VXLAN tunnel, alternatively, the tunnel between the LS 1 and the LS 2 may be another tunnel. For example, the tunnel between the LS 1 and the LS 2 may be a segment routing-traffic engineering (SR-TE) path.

That the LS 1 learns the MAC address of the server 1 and sends the MAC address of the server 1 to the LS 2 through the routing message is described in the foregoing example. Any LS in FIG. 1A may learn, in a similar manner, a MAC address of a server on a network administrated by the LS, and send the MAC address of the server to a remote LS through a routing message. For example, a VXLAN tunnel may exist between an LS 3 and the LS 2. The LS 3 may learn a MAC address of a server 5, and the LS 3 may send a routing message carrying the MAC address of the server 5 to the LS 2 through the VXLAN tunnel between the LS 3 and the LS 2.

In the foregoing example, the LS and the SS in FIG. 1A are switches. Alternatively, the LS and the SS in FIG. 1A may be other network devices, for example, the LS and the SS in FIG. 1A may be routers. In a possible design, the LS and the SS may be provider edge (PE) routers. The PE router is located at an edge of a core network, and the PE router may be configured to connect to a CE router. In another possible design, the LS may be the PE router, and the SS may be a provider (P) router. The P router is a label-switching router (LSR), the P router is a transit router on the core network, and the P router may be configured to connect to one or more PE routers. FIG. 1B is a schematic structural diagram of a switch, and FIG. 1B may also be a schematic structural diagram of another network device. For example, FIG. 1B may also be a schematic structural diagram of a router.

In the foregoing example, the LS in FIG. 1A is configured to connect to a server. In a possible design, the LS may be directly connected to the server through a cable or an optical cable. In another possible design, the LS may be indirectly connected to the server through an intermediate device, and the intermediate device may be a router, an Ethernet switch, or a gateway. Alternatively, the LS in FIG. 1A may be connected to another type of host, and the another type of host may be a personal computer or a virtual machine (VM). The virtual machine may run on a physical server. In a possible design, the LS may be connected to the physical server through an access device, and the access device may be a gateway or an Ethernet switch. FIG. 1C is a schematic structural diagram of a server, and FIG. 1C may also be a schematic structural diagram of another host. For example, FIG. 1C may also be a schematic structural diagram of a personal computer. In the foregoing embodiments, it is assumed that the server 1 in FIG. 1A is an authorized user. After learning the MAC address of the server 1, namely, the authorized user, the LS 1 sends the routing message including the MAC address of the server 1 to the LS 2. The LS 2 generates the forwarding entry based on the routing message, so that the server (for example, the server 3) on the network administrated by the LS 2 can communicate with the server 1 by using the forwarding entry.

In a possible scenario, the server 1 in FIG. 1A is an unauthorized user. Specifically, the server 1 may be an attacker. For example, the server 1 may initiate a cyberattack, and the cyberattack may be a distributed denial-of-service (DDoS) attack, a man-in-the-middle attack, Address Resolution Protocol (ARP) poisoning, ping flood, wiretapping, idle scan, or port scan.

The following uses an example in which the cyberattack is the DDoS attack to describe an attack behavior of the server 1 and a process in which the LS 1 identifies the server 1 as the attacker.

In a possible design, a user of the server 1 installs and runs software on the server 1 when knowing that the software can initiate the DDoS attack. Under control of the software, the server 1 sends a plurality of packets to initiate the DDoS attack. The LS 1 can identify the DDoS attack. For example, the LS 1 includes the processor and the memory, and the memory stores a computer program used to identify the DDoS attack. The LS 1 receives the plurality of packets, and the processor in the LS 1 analyzes features of the plurality of packets by executing the computer program, to determine that the server 1 is the attacker. Further, the LS 1 obtains the MAC address (for example, a MAC address 1) of the server 1 by parsing a source MAC address of the plurality of packets, and the LS 1 determines that a host (for example, the server 1) identified by the MAC address 1 is the attacker.

In another possible design, the server 1 is infected by a computer virus due to a mis-operation of the user, and the computer virus can initiate the DDoS attack. Computer virus monitoring software is pre-installed and run on the server 1. The computer virus monitoring software identifies a behavior of the computer virus (a process on the server 1), and determines that the server 1 is infected by the computer virus. Further, the server 1 determines, under control of the computer virus monitoring software, that the server 1 is the attacker. The server 1 sends a message 1 to a network management server (not shown in FIG. 1A), and the message 1 is used to notify the network management server that the server 1 is the attacker. For example, the message 1 carries the MAC address (for example, the MAC address 1) of the server 1. After determining that the server 1 is the attacker based on the message 1, the network management server generates a message 2, and the network management server sends the message 2 to the LS 1. The message 2 is used to notify the LS 1 that the server 1 is the attacker. For example, the message 2 carries the MAC address 1. After receiving the message 2, the LS 1 determines, based on the MAC address 1 carried in the message 2, that the host (for example, the server 1) identified by the MAC address 1 is the attacker.

After determining that the host (for example, the server 1) identified by the MAC address 1 is the attacker, the LS 1 generates a routing message 2. The processor (for example, the central processing unit) in the LS 1 may generate the routing message 2 by executing the code for implementing the BGP function. The routing message 2 includes the MAC address 1 and indication information 1, and the indication information 1 is used to indicate that the host (for example, the server 1) identified by the MAC address 1 is the attacker. The LS 1 sends the routing message 2 to the LS 2, and the LS 1 may generate the routing message 2 based on the configuration information stored by the LS 1 and the MAC address of the server 1. For a process in which the LS 1 generates the routing message 2 based on the MAC address of the server 1, refer to the foregoing descriptions of a generation process of the routing message 1. The MAC address 1 may be carried in a MAC/IP advertisement route included in the routing message 2. Specifically, the MAC address 1 may be carried in a MAC address field of the MAC/IP advertisement route. For a format of the routing message 2, refer to the foregoing descriptions of a format of the routing message 1.

It should be noted that the routing message 1 is generated by the LS 1 when the LS 1 determines that the server 1 is the authorized user. The LS 1 advertises the MAC address of the server 1 to the LS 2, to enable the LS 2 to generate the forwarding entry. Further, the server (for example, the server 3) administrated by the LS 2 may communicate with the server 1 through the LS 2. The routing message 2 is generated when the LS 1 determines that the server 1 is the attacker. The LS 1 advertises the MAC address of the server 1 to the LS 2, to enable the LS 2 to generate a forwarding rule. Further, the server (for example, the server 3) administrated by the LS 2 avoids communicating with the server 1 through the LS 2.

A function of the routing message 2 is different from a function of the routing message 1, and content of the routing message 2 is different from content of the routing message 1. Specifically, the routing message 2 includes the indication information 1 used to indicate that the host (for example, the server 1) identified by the MAC address 1 is the attacker, and the routing message 1 does not include the indication information 1. In a possible design, the indication information 1 is carried in a MAC mobility extended community in the routing message 2. The MAC mobility extended community includes flags field, and the flags field has eight bits. The indication information 1 may be carried on an MSB of the flags field. For example, when being equal to 1, the MSB of the flags field indicates that the host (for example, the server 1) identified by the MAC address 1 in the routing message 2 is the attacker.

After receiving the routing message 2 from the LS 1, the LS 2 may generate a forwarding rule 1 and a forwarding rule 2 based on the routing message 2. The LS 2 avoids, according to the forwarding rule 1, forwarding a packet that is received by the LS 2 and whose destination MAC address is the MAC address 1 to the host (for example, the server 1) identified by the MAC address 1. The LS 2 avoids, according to the forwarding rule 2, forwarding a packet that is received by the LS 2 and whose source MAC address is the MAC address 1.

The forwarding rule 1 may be specifically a forwarding entry 1, and the forwarding rule 2 may be specifically a forwarding entry 2. A forwarding plane of the LS 2 may include a forwarding table. The forwarding table may include the forwarding entry 1 and the forwarding entry 2, and a processor (for example, a network processor) of the forwarding plane may process a received packet based on the forwarding table.

The forwarding entry 1 includes a match field and an action field. A value of the match field of the forwarding entry 1 is equal to the MAC address 1, the action field of the forwarding entry 1 may include a discard instruction, and the match field of the forwarding entry 1 is used to match with a destination MAC address of a packet (for example, a packet 1) received by the LS 2. When determining that the destination MAC address of the packet 1 is equal to a value of the match field of the forwarding entry 1, the LS 2 determines that the packet 1 matches the forwarding entry 1. Further, the LS 2 may perform discarding processing on the packet 1 according to the discard instruction of the action field of the forwarding entry 1. Certainly, the action field of the forwarding entry 1 may include another instruction, and the another instruction may instruct the LS 1 to send the packet 1 to a control plane of the LS 2. A processor of the control plane may be a CPU, and after receiving the packet 1 from the forwarding plane, the CPU may analyze the packet 1. In addition, under control of the CPU, the LS 2 may further send the packet 1 to the network management server, so that the network management server analyzes the packet 1. When the LS 2 processes the packet 1 according to forwarding rule 1, it does not mean that the LS 2 can only perform the discarding processing on the packet 1. The LS 2 may also perform other processing on the packet 1 as long as the LS 2 does not forward the packet 1 to the host identified by the MAC address 1, for example, the server 1.

The forwarding entry 2 includes a match field and an action field. A value of the match field of the forwarding entry 2 is equal to the MAC address 1, the action field of the forwarding entry 2 may include a discard instruction, and the match field of the forwarding entry 2 is used to match with a source MAC address of a packet (for example, a packet 2) received by the LS 2. When determining that the source MAC address of the packet 2 is equal to a value of the match field of the forwarding entry 2, the LS 2 determines that the packet 2 matches the forwarding entry 2. Further, the LS 2 may perform the discarding processing on the packet 2 according to the discard instruction of the action field of the forwarding entry 2. It may be understood that, that the source MAC address of the packet 2 received by the LS 2 is equal to the MAC address 1 may be because the server 1 roams from the network administrated by the LS 1 to the network administrated by the LS 2. Another possibility is that a host on the network administrated by the LS 2 peculates the MAC address of the server 1. For example, when constructing an Ethernet frame, the server 4 peculates the MAC address of the server 1, and uses the MAC address of the server 1 as a source MAC address of the constructed Ethernet frame.

Figure 2:
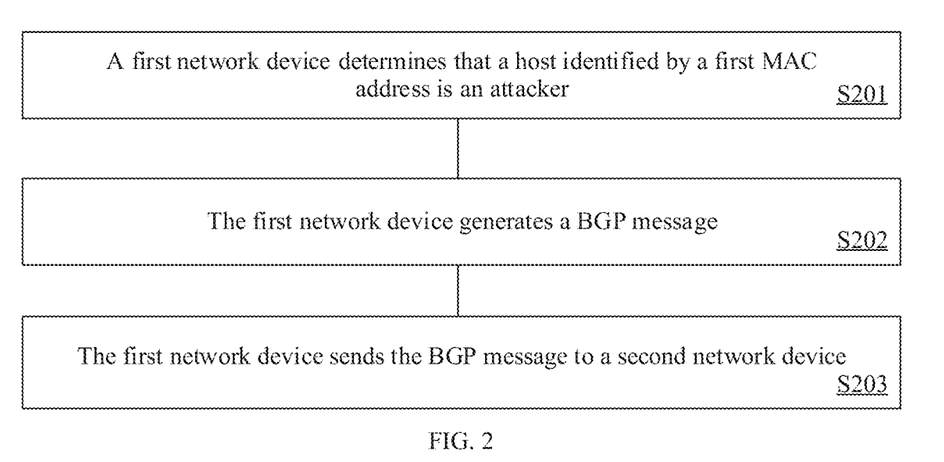
FIG. 2 is a schematic flowchart of a BGP message sending method.

FIG. 2 is a schematic flowchart of a BGP message sending method. The method shown in FIG. 2 is performed by a first network device. For example, the first network device may be the LS 1 in FIG. 1A. For a structure and a function of the first network device, refer to the descriptions about a structure and a function of the LS 1 in the foregoing embodiment. The first network device may perform an action performed by the LS 1 described in the foregoing embodiment. For a specific implementation of the method shown in FIG. 2, refer to the related descriptions in the foregoing embodiment. Referring to FIG. 2, the method includes S201, S202, and S203.

S201: A first network device determines that a host identified by a first MAC address is an attacker.

For example, the first MAC address may be a MAC address 1, and the host identified by the first MAC address may be a server 1.

S202: The first network device generates a BGP message.

The BGP message includes the first MAC address and indication information, and the indication information is used to indicate that the host identified by the first MAC address is the attacker.

For example, the BGP message may be a routing message 2, and the indication information may be indication information 1.

S203: The first network device sends the BGP message to a second network device.

For example, the second network device may be an LS 2, and the LS 1 may send the BGP message to the LS 2 through a VXLAN tunnel between the LS 1 and the LS 2.

In the foregoing technical solution, after the first network device determines that the host identified by the first MAC address is the attacker, the first network device may generate the BGP message carrying the first MAC address and the indication information, and send the BGP message to the second network device. Further, the second network device may generate, based on the first MAC address and the indication information in the BGP message, a forwarding rule used to prevent the second network device from forwarding a packet received by the second network device to the host identified by the first MAC address. In other words, the second network device may generate the forwarding rule based on the BGP message sent by the first network device, and an engineer does not need to manually configure the forwarding rule on the second network device. Therefore, the foregoing technical solution helps reduce workloads of the engineer in performing manual configuration on the network device.

In a possible design, the first network device includes a first VTEP, and the second network device includes a second VTEP.

That the first network device sends the BGP message to a second network device includes: The first VTEP sends the BGP message to the second VTEP.

For example, the first VTEP may be a VTEP 1, and the second VTEP may be a VTEP 2. The VTEP 1 may include a sending interface of the LS 1, and the sending interface may be an Ethernet interface. The VTEP 2 may include a receiving interface of the LS 2, and the receiving interface may be an Ethernet interface. The VTEP 1 may send the routing message 2 to the VTEP 2 through the VXLAN tunnel between the LS 1 and the LS 2.

In a possible design, a first VTEP address identifies the first VTEP, and a second VTEP address identifies the second VTEP. The BGP message includes an IP header and a payload. The IP header includes a destination IP address, and the payload includes MP_REACH_NLRI. The MP_REACH_NLRI includes a next-hop network address. The destination IP address is equal to the second VTEP address, and the next-hop network address is equal to the first VTEP address.

For example, the first VTEP address may be a VTEP IP address 1, and the second VTEP address may be a VTEP IP address 2.

In a possible design, the first VTEP sends a BGP update message to the second VTEP through a tunnel. The tunnel is a VXLAN tunnel or a label-switched path (LSP). The LSP may be an SR-TE path.

Optionally, in the method shown in FIG. 2, the BGP message includes a MAC/IP advertisement route and a MAC mobility extended community. The first MAC address is carried in the MAC/IP advertisement route, and the indication information is carried in the MAC mobility extended community.

Further, the MAC mobility extended community includes flags having 8 bits, and the indication information is carried on an MSB of the flags.

Further, in the method shown in FIG. 2, the BGP message is the BGP update message.

In a possible design, S202 includes: The first network device receives a data packet, where a source MAC address of the data packet is the first MAC address; and the first network device generates the BGP message based on a host identified by the source MAC address of the data packet being the attacker.

In the foregoing technical solution, the first network device generates the BGP message based on triggering of the data packet. In other words, when the first network device determines that the host identified by the first MAC address is the attacker, the first network device does not need to immediately generate the BGP message and notify the second network device. When the first network device determines that the host identified by the first MAC address is the attacker, it is possible that the host identified by the first MAC address does not access a network administrated by the first network device. For example, the host identified by the first MAC address may have been offline, or the host identified by the first MAC address may have roamed to another network. Therefore, when the first network device determines that the host identified by the first MAC address is the attacker, the first network device and the second network device may not be attacked by the attacker. When the first network device is not attacked by the attacker, the first network device temporarily does not generate or send the BGP message. This helps reduce overheads of the first network device and the second network device. When the first network device receives the data packet whose source MAC address is the first MAC address, it indicates that the first network device starts to be attacked by the attacker. When the first network device starts to be attacked by the attacker, the first network device notifies the second network device of the MAC address of the attacker. This helps obtain a compromise between reduction of overheads and prevention of an attack from the attacker.

In a possible design, S202 includes the following. The first network device determines that the data packet is from a first VXLAN, where a first VNI identifies the first VXLAN. The first network device determines, based on the source MAC address carried in the data packet and that the data packet is from a first VXLAN, that the host identified by the first MAC address is located on the first VXLAN. The first network device generates the BGP message based on that the data packet is from a first VXLAN, where the BGP message includes the first VNI.

In a possible implementation, that the first network device determines that the data packet is from a first VXLAN includes the following. The first network device receives the data packet through a first port, where the first port is configured with the first VNI. The first network device determines, based on that the first port configured to receive the data packet is configured with the first VNI, that the data packet is from the first VXLAN.

In another possible implementation, that the first network device determines that the data packet is from a first VXLAN includes the following. The first network device determines that a VLAN ID included in the data packet is configured with the first VNI. The first network device determines, based on that the first VLAN ID included in the data packet is configured with the first VNI, that the data packet is from the first VXLAN.

In the foregoing technical solution, the first network device determines, based on configuration information, that the data packet is from the first VXLAN. Further, the first network device carries, in the BGP message, the first VNI used to identify the first VXLAN. The second network device learns a corresponding EVPN route based on the first VNI in the BGP message.

Figure 3:
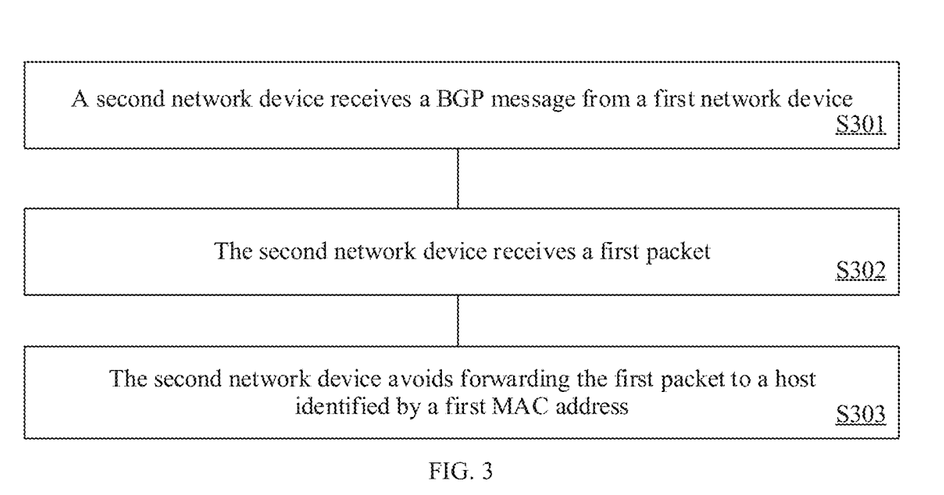
FIG. 3 is a schematic flowchart of a BGP message receiving method.

FIG. 3 is a schematic flowchart of a BGP message receiving method. The method shown in FIG. 3 is performed by a second network device. For example, the second network device may be the LS 2 in FIG. 1A. For a structure and a function of the second network device, refer to the descriptions about a structure and a function of the LS 2 in the foregoing embodiment. The second network device may perform an action performed by the LS 2 described in the foregoing embodiment. For a specific implementation of the method shown in FIG. 3, refer to the related descriptions in the foregoing embodiment. Referring to FIG. 3, the method includes S301, S302, and S303.

S301: A second network device receives a BGP message from a first network device.

The BGP message includes a first MAC address and indication information, and the indication information is used to indicate that a host identified by the first MAC address is an attacker.

For example, the first network device may be an LS 1, the first MAC address may be a MAC address 1, and the host identified by the first MAC address may be a server 1. The BGP message may be a routing message 2, and the indication information may be indication information 1.

S302: The second network device receives a first packet.

A destination MAC address of the first packet is equal to the first MAC address.

For example, the first packet may be an Ethernet frame generated by a host on a network administrated by the LS 2. For example, the first packet may be an Ethernet frame generated by a server 3, or an Ethernet frame generated by a server 4. The LS 2 may receive the first packet through an Ethernet interface of the LS 2. That a destination MAC address of the first packet is equal to the first MAC address indicates that a generator (for example, the server 3) of the first packet wants to communicate with the host (for example, the server 1) identified by the first MAC address.

S303: The second network device avoids forwarding the first packet to a host identified by a first MAC address.

Specifically, the second network device avoids, based on the first MAC address in the BGP message, the indication information in the BGP message, and the destination MAC address of the first packet, forwarding the first packet to the host identified by the first MAC address.

For example, the LS 2 may generate a forwarding entry 1 based on the routing message 2, and the first packet may be a packet 1. The LS 2 may perform discarding processing or other processing on the packet 1 based on the forwarding entry 1. For a generation process of the forwarding entry 1, a structure of the forwarding entry 1, and how the packet 1 is processed based on the forwarding entry 1, refer to the foregoing related descriptions. Details are not described herein again.

In the foregoing technical solution, after receiving the BGP message that carries the first MAC address and the indication information, the second network device avoids, based on the first MAC address in the BGP message, the indication information in the BGP message, and the destination MAC address of the first packet, forwarding the first packet to the host identified by the first MAC address.

In other words, the second network device may form, by using the BGP message sent by the first network device, a forwarding mechanism of avoiding forwarding the first packet to the host identified by the first MAC address. Therefore, an engineer does not need to manually configure, on the second network device, a forwarding rule for the destination MAC address being the first MAC address. Therefore, the foregoing technical solution helps reduce workloads of the engineer in performing manual configuration on the network device.

In a possible design, the technical solution shown in FIG. 3 may further include the following.

The second network device receives a second packet, where a source MAC address of the second packet is equal to the first MAC address.

The second network device avoids, based on the first MAC address in the BGP message, the indication information in the BGP message, and the source MAC address of the second packet, forwarding the second packet.

For example, the LS 2 may generate a forwarding entry 2 based on the routing message 2, and the second packet may be a packet 2. The LS 2 may perform the discarding processing on the packet 2 based on the forwarding entry 2. For a generation process of the forwarding entry 2, a structure of the forwarding entry 2, and how the packet 2 is processed based on the forwarding entry 2, refer to the foregoing related descriptions. Details are not described herein again.

In a possible design, the first network device includes a first VTEP, and the second network device includes a second VTEP. S301 includes: The second VTEP receives a border gateway protocol BGP update message from the second VTEP.

The BGP message is carried in the BGP update message, and the BGP update message includes an IP header and a payload. The IP header includes a destination IP address, and the payload includes MP_REACH_NLRI. The MP_REACH_NLRI includes a next-hop network address. The destination IP address is equal to a second VTEP address, and the next-hop network address is equal to a first VTEP address.

For example, the first VTEP may be a VTEP 1, and the second VTEP may be a VTEP 2. The VTEP 1 may include a sending interface of the LS 1, and the sending interface may be an Ethernet interface. The VTEP 2 may include a receiving interface of the LS 2, and the receiving interface may be an Ethernet interface. The VTEP 2 may receive the routing message 2 sent by the VTEP 1 through a VXLAN tunnel between the LS 1 and the LS 2.

For example, the first VTEP address may be a VTEP IP address 1, and the second VTEP address may be a VTEP IP address 2.

In a possible design, the second VTEP receives the BGP update message sent by the first VTEP through a tunnel. The tunnel is a VXLAN tunnel or an LSP. The LSP may be an SR-TE path.

Optionally, in the method shown in FIG. 3, the BGP message includes a MAC/IP advertisement route and a MAC mobility extended community. The first MAC address is carried in the MAC/IP advertisement route, and the indication information is carried in the MAC mobility extended community.

Further, the MAC mobility extended community includes flags having 8 bits, and the indication information is carried on an MSB of the flags.

Further, in the method shown in FIG. 3, the BGP message is the BGP update message.

Figure 4:
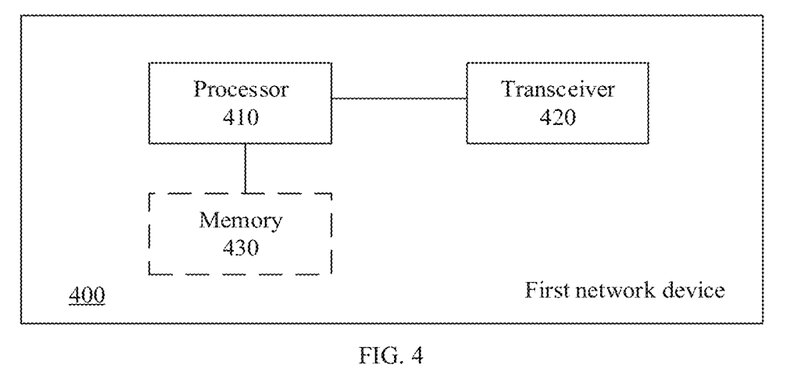
FIG. 4 is a schematic structural diagram of a first network device.

FIG. 4 is a schematic structural diagram of a first network device 400. The first network device 400 includes a processor 410 and a transceiver 420, and the processor 410 is coupled to the transceiver 420. The first network device 400 shown in FIG. 4 may perform the method shown in FIG. 2. For example, the first network device 400 may be the LS 1 in FIG. 1A. For a specific implementation of the first network device 400, refer to the embodiment shown in FIG. 2, or refer to the descriptions of the LS 1.

The processor 410 is configured to determine that a host identified by a first MAC address is an attacker.

For example, the processor 410 may be a processor, an ASIC, or an FPGA.

The processor 410 is further configured to generate a BGP message. The BGP message includes the first MAC address and indication information, and the indication information is used to indicate that the host identified by the first MAC address is the attacker.

For example, the processor 410 generates the BGP message based on that the host identified by the first MAC address is the attacker.

The transceiver 420 is configured to send the BGP message generated by the processor 410 to a second network device.

For example, the second network device may be the LS 2 in FIG. 1A.

In a possible design, the first network device 400 may include a memory 430. The memory 430 is coupled to the processor 410, and the memory 430 may store a computer program. For example, the memory 430 stores a computer program used to identify a DDoS attack. The processor 410 analyzes features of a plurality of packets from an attacker by executing the computer program, to determine that the plurality of packets belong to the DDoS attack. A source MAC address of the plurality of packets is a MAC address 1. The processor 410 determines, based on the source MAC address of the plurality of packets, that a host (for example, a server 1) identified by the MAC address 1 is the attacker.

In a possible design, the first network device includes a first VTEP, and the second network device includes a second VTEP.

The transceiver 420 is configured to send the BGP message from the first VTEP to the second VTEP.

For example, a VXLAN tunnel exists between the first VTEP and the second VTEP, and the transceiver 420 is located on the VXLAN tunnel. For example, the transceiver 420 includes an Ethernet interface, and the transceiver 420 may receive and send a packet (for example, an Ethernet frame) that complies with an Ethernet protocol.

In a possible design, the BGP message includes a media access control/internet protocol advertisement route MAC/IP advertisement route and a media access control mobility extended community MAC mobility extended community. The first MAC address is carried in the MAC/IP advertisement route, and the indication information is carried in the MAC mobility extended community.

In a possible design, the MAC mobility extended community includes flags having 8 bits, and the indication information is carried on an MSB of the flags.

In a possible design, the BGP message is a BGP update message.

Figure 5:
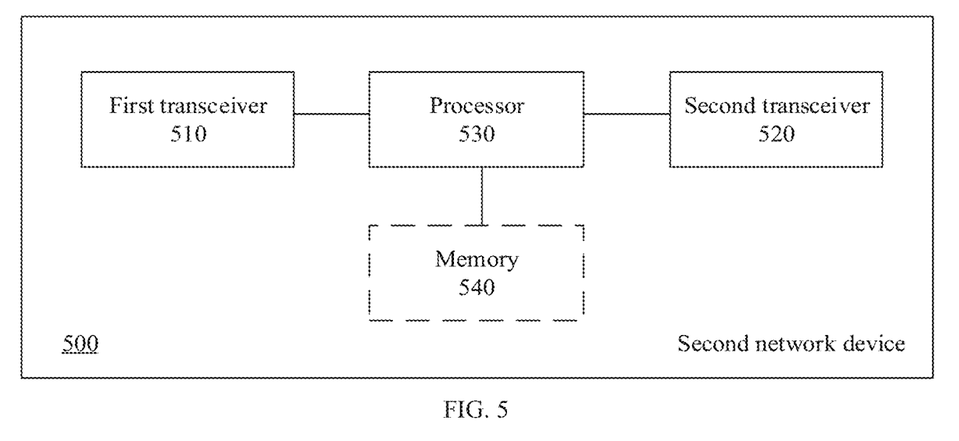
FIG. 5 is a schematic structural diagram of a second network device.

FIG. 5 is a schematic structural diagram of a second network device 500. The second network device 500 includes a first transceiver 510, a second transceiver 520, and a processor 530. The first transceiver 510 is coupled to the processor 530, and the second transceiver 520 is coupled to the processor 530. The second network device 500 shown in FIG. 5 may perform the method shown in FIG. 3. For example, the second network device 500 may be the LS 2 in FIG. 1A. For a specific implementation of the second network device 500, refer to the embodiment shown in FIG. 3, or refer to the descriptions of the LS 2.

The first transceiver 510 is configured to receive a BGP message from a first network device. The BGP message includes a first media access control MAC address and indication information, and the indication information is used to indicate that a host identified by the first MAC address is an attacker.

The second transceiver 520 is configured to receive a first packet. A destination MAC address of the first packet is equal to the first MAC address.

For example, the first transceiver 510 may include an Ethernet interface, and the first transceiver 510 may receive and send a packet (for example, an Ethernet frame) that complies with an Ethernet protocol. The second transceiver 520 may include an Ethernet interface, and the second transceiver 520 may receive and send a packet (for example, an Ethernet frame) that complies with an Ethernet protocol.

For example, the first transceiver 510 may be located on a VXLAN tunnel between an LS 1 and the LS 2. The second transceiver 520 may be configured to connect to a network administrated by the LS 2, and the second transceiver 520 may be configured to connect to a server 3 and a server 4.

The processor 530 is configured to avoid, based on the first MAC address in the BGP message, the indication information in the BGP message, and the destination MAC address of the first packet, forwarding the first packet to the host identified by the first MAC address.

For example, the processor 530 may be a central processing unit, an ASIC, or an FPGA.

In a possible design, the second network device 500 may include a memory 540. The memory 540 is coupled to the processor 530, and the memory 540 may store a computer program. For example, the memory 540 stores a computer program used to implement a BGP function. The processor 530 generates, based on the BGP message and configuration information of the second network device 500, a forwarding entry 1 by executing the computer program. The first packet may be a packet 1. The LS 2 may perform discarding processing or other processing on the packet 1 based on the forwarding entry 1. For a generation process of the forwarding entry 1, a structure of the forwarding entry 1, and how the packet 1 is processed based on the forwarding entry 1, refer to the foregoing related descriptions. Details are not described herein again.

In a possible design, the second receiver 520 is further configured to receive a second packet. A source MAC address of the second packet is equal to the first MAC address.

The processor 530 is further configured to avoid, based on the first MAC address in the BGP message, the indication information in the BGP message, and the source MAC address of the second packet, forwarding the second packet.

For example, the LS 2 may generate a forwarding entry 2 based on a routing message 2, and the second packet may be a packet 2. The LS 2 may perform the discarding processing on the packet 2 based on the forwarding entry 2. For a generation process of the forwarding entry 2, a structure of the forwarding entry 2, and how the packet 2 is processed based on the forwarding entry 2, refer to the foregoing related descriptions. Details are not described herein again.

In a possible design, the first network device includes a first VTEP, and the second network device includes a second VTEP.

The first transceiver 510 is configured to send the BGP message from the first VTEP to the second VTEP.

The first transceiver 510 may be located on the VXLAN tunnel between the LS 1 and the LS 2. After receiving the BGP message from the first VTEP (included in the first network device) through the VXLAN tunnel, the first transceiver 510 may send the BGP message to the second VTEP in the second network device.

In a possible design, the BGP message includes a media access control/internet protocol advertisement route MAC/IP advertisement route and a media access control mobility extended community MAC mobility extended community. The first MAC address is carried in the MAC/IP advertisement route, and the indication information is carried in the MAC mobility extended community.

In a possible design, the MAC mobility extended community includes flags having 8 bits, and the indication information is carried on an MSB of the flags.

Figure 6:
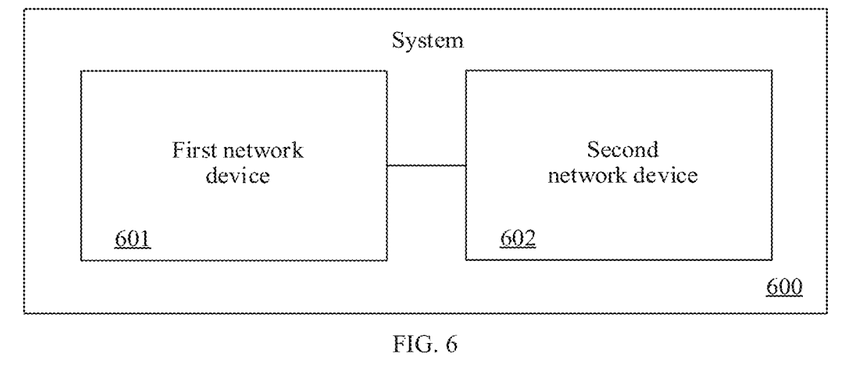
FIG. 6 is a schematic structural diagram of a system.

FIG. 6 shows a system. Referring to FIG. 6, the system 600 includes a first network device 601 and a second network device 602. The first network device 601 may be the first network device 400 shown in FIG. 4, and the second network device 602 may be the second network device 500 shown in FIG. 5. For example, the first network device 601 may perform the method shown in FIG. 2, and the second network device 602 may perform the method shown in FIG. 3. Specifically, the first network device 601 may be the LS 1 in FIG. 1A, and the second network device 602 may be the LS 2 in FIG. 1A. For a specific implementation of the first network device 601, refer to the embodiment shown in FIG. 2 or the descriptions of the LS 1. For a specific implementation of the second network device 602, refer to the embodiment shown in FIG. 3 or the descriptions of the LS 2n.

A computer-readable storage medium stores a computer program. When the computer program is executed by a network device, the network device is enabled to perform the method shown in FIG. 2 or the method shown in FIG. 3. For example, the network device may be the first network device in the method shown in FIG. 2 or the second network device in the method shown in FIG. 3.

A computer program product includes a computer program. The computer program may be stored in a computer-readable storage medium. When the computer program is executed by a network device, the network device is enabled to perform the method shown in FIG. 2 or the method shown in FIG. 3. For example, the network device may be the first network device in the method shown in FIG. 2 or the second network device in the method shown in FIG. 3.

A method or steps in a method may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that described functions may be implemented by hardware, software, firmware, or any combination thereof. The described functions may also be implemented by a combination of software and hardware. The software may be stored in a computer-readable medium. The computer-readable medium includes a computer storage medium and a communications medium. The communications medium includes a medium that enables a computer program to be transmitted from one place to another. The storage medium may be a medium accessible to a general-purpose or special-purpose computer.

Objectives, technical solutions, and beneficial effects are further described in detail in the foregoing specific implementations. It should be understood that the foregoing descriptions are merely specific implementations.

What is claimed is:

1. A method, comprising:
generating a Border Gateway Protocol (BGP) message comprising a first medium access control (MAC) address of a remote server and indication information, wherein the indication information is carried in a bit of a flag and indicates that a host identified by the first MAC address is an attacker, and wherein the indication information is carried in a most significant bit (MSB) of the flag; and
sending the BGP message comprising the indication information carried in the MSB of the flag from a first network device to a second network device to notify the second network device that the host identified by the first MAC address is the attacker and to instruct the second network device to avoid forwarding, in response to a destination MAC address of a received packet being the same as the first MAC address, the received packet to the host, wherein the first network device comprises a first Virtual eXtensible Local Area Network tunnel end point (VTEP), and wherein the second network device comprises a second VTEP.

2. The method of claim 1, wherein sending the BGP message comprises sending the BGP message from the first VTEP to the second VTEP.

3. The method of claim 1, wherein the BGP message comprises a MAC/Internet Protocol (IP) advertisement route and a MAC mobility extended community, wherein the MAC/IP advertisement route comprises the first MAC address, and wherein the MAC mobility extended community comprises the indication information.

4. The method of claim 3, wherein the MAC mobility extended community comprises the flag.

5. The method of claim 1, wherein the BGP message is a BGP update message.

6. A method, comprising:
receiving, by a second network device and from a first network device, a Border Gateway Protocol (BGP) message comprising a first medium access control (MAC) address of a remote server and indication information, wherein the indication information is carried in a bit of a flag and indicates that a host identified by the first MAC address is an attacker, wherein the indication information is carried in a most significant bit (MSB) of the flag, wherein the BGP message notifies the second network device that the host identified by the MAC address is the attacker and instructs the second network device to avoid forwarding, in response to a destination MAC address of a received packet being the same as the first MAC address, the received packet to the host, wherein the first network device comprises a first Virtual eXtensible Local Area Network tunnel end point (VTEP), and wherein the second network device comprises a second VTEP;
receiving a first packet comprising the destination MAC address; and
avoiding forwarding, in response to the destination MAC address being the first MAC address, the first packet to the host.

7. The method of claim 6, further comprising:
receiving a second packet comprising a source MAC address; and
avoiding forwarding, in response to the source MAC address being the first MAC address, the second packet.

8. The method of claim 6, wherein the method further comprises receiving routing information by the second VTEP and from the first VTEP.

9. The method of claim 6, wherein the BGP message comprises a MAC/Internet Protocol (IP) advertisement route and a MAC mobility extended community, wherein the MAC/IP advertisement route comprises the first MAC address, and wherein the MAC mobility extended community comprises the indication information.

10. The method of claim 9, wherein the MAC mobility extended community comprises the flag.

11. An apparatus, comprising:
a memory configured to store instructions; and
one or more processors coupled to the memory and configured to execute the instructions to:
generate a Border Gateway Protocol (BGP) message comprising a first medium access control (MAC) address of a remote server and indication information, wherein the indication information is carried in a bit of a flag and indicates that a host identified by the first MAC address is an attacker, and wherein the indication information is carried in a most significant bit (MSB) of the flag; and
send the BGP message comprising the indication information carried in the MSB of the flag to a network device to notify the network device that the host identified by the first MAC address in the attacker and to instruct the network device to avoid forwarding, in response to a destination MAC address of a received packet being the same as the first MAC address, the received packet to the host, wherein the apparatus comprises a first Virtual eXtensible Local Area Network tunnel end point (VTEP), and wherein the network device comprises a second VTEP.

12. The apparatus of claim 11, wherein the one or more processors are further configured to further send the BGP message from the first VTEP to the second VTEP.

13. The apparatus of claim 11, wherein the BGP message comprises a MAC/Internet Protocol (IP) advertisement route and a MAC mobility extended community, wherein the MAC/IP advertisement route comprises the first MAC address, and wherein the MAC mobility extended community comprises the indication information.

14. The apparatus of claim 13, wherein the MAC mobility extended community comprises the flag.

15. The apparatus of claim 11, wherein the BGP message is a BGP update message.

16. An apparatus, comprising;
a memory configured to store instructions; and
one or more processors coupled to the memory and configured to execute the instructions to:
  receive, from a network device, a Border Gateway Protocol (BGP) message comprising a first medium access control (MAC) address of a remote server and indication information, wherein the indication information is carried in a bit of a flag and indicates that a host identified by the first MAC address is an attacker, wherein the indication information is carried in a most significant bit (MSB) of the flag, and wherein the BGP message notifies the apparatus that the host identified by the MAC address is the attacker and instructs the apparatus to avoid forwarding, in response to a destination MAC address of a received packet being the same as the first MAC address, the received packet to the host, wherein the network device comprises a first Virtual eXtensible Local Area Network tunnel end point (VTEP), and wherein the apparatus comprises a second VTEP;
  receive a first packet comprising the destination MAC address; and
  avoid forwarding, in response to the destination MAC address being the first MAC address, the first packet to the host identified by the first MAC address.

17. The apparatus of claim 16, wherein the one or more processors are further configured to:
  receive a second packet comprising a source MAC address; and
  avoid forwarding, in response to the source MAC address being the first MAC address, the second packet.

18. The apparatus of claim 16, wherein the one or more processors are further configured to receive routing information by the second VTEP and from the first VTEP.

19. The apparatus of claim 16, wherein the BGP message comprises a MAC/Internet Protocol (IP) advertisement route and a MAC mobility extended community, wherein the MAC/IP advertisement route comprises the first MAC address, and wherein the MAC mobility extended community comprises the indication information.

20. The apparatus of claim 19, wherein the MAC mobility extended community comprises the flag.

21. The apparatus of claim 11, wherein the BGP message comprises an Ethernet virtual private network (EVPN) MAC/IP advertisement route.

* * * * *